US010174429B2

United States Patent
Kalakodimi et al.

(10) Patent No.: US 10,174,429 B2
(45) Date of Patent: Jan. 8, 2019

(54) CORROSION CONTROL FOR WATER SYSTEMS USING TIN CORROSION INHIBITOR WITH A HYDROXYCARBOXYLIC ACID

(71) Applicant: CHEMTREAT, INC., Glen Allen, VA (US)

(72) Inventors: Rajendra Prasad Kalakodimi, Glen Allen, VA (US); Curt Turner, Mechanicsville, VA (US); DeAnn Wills-Guy, Ruther Glen, VA (US)

(73) Assignee: CHEMTREAT, INC, Glen Allen, VA (US)

( * ) Notice: Subject to any disclaimer, the term of this patent is extended or adjusted under 35 U.S.C. 154(b) by 250 days.

(21) Appl. No.: 14/933,655

(22) Filed: Nov. 5, 2015

(65) Prior Publication Data

US 2017/0130340 A1     May 11, 2017

(51) Int. Cl.
*C23F 11/08* (2006.01)
*C02F 103/02* (2006.01)

(52) U.S. Cl.
CPC ........ *C23F 11/08* (2013.01); *C02F 2103/023* (2013.01); *C02F 2303/08* (2013.01); *C02F 2307/14* (2013.01)

(58) Field of Classification Search
CPC ....................................................... C23F 11/18
USPC .......................................................... 422/7
See application file for complete search history.

(56) References Cited

U.S. PATENT DOCUMENTS

| 4,512,552 | A | * | 4/1985 | Katayama | ............... C23F 11/08 252/181 |
| 4,885,136 | A | † | 12/1989 | Katayama | |
| 6,001,156 | A |   | 12/1999 | Riggs, Jr. | |
| 6,200,529 | B1 |  | 3/2001 | Riggs, Jr. | |
| 7,910,024 | B2 | † | 3/2011 | Stapp | |
| 9,404,188 | B2 | † | 8/2016 | Smith | |
| 2009/0250653 | A1 | | 10/2009 | Kiely et al. | |
| 2010/0111756 | A1 | | 5/2010 | Crovetto et al. | |
| 2015/0004054 | A1* | | 1/2015 | Richardson | ............... C02F 1/68 422/15 |
| 2015/0118103 | A1* | | 4/2015 | Erickson | ................. C23F 11/08 422/7 |

FOREIGN PATENT DOCUMENTS

EP     0 265 723 A1    5/1988

OTHER PUBLICATIONS

Feb. 1, 2017 Written Opinion of the International Searching Authority issued in International Patent Application No. PCT/US2016/000101.
Feb. 1, 2017 International Search Report issued in International Patent Application No. PCT/US2016/000101.
(Continued)

*Primary Examiner* — Sean E Conley
(74) *Attorney, Agent, or Firm* — Oliff PLC

(57) ABSTRACT

There are provided methods and methods and compositions for suppressing corrosion of a corrodible metal surface that contacts a water stream in a water system. The method comprises introducing into the water stream a treatment composition, the treatment composition including a Tin(II) corrosion inhibitor and a hydroxycarboxylic acid promoter.

11 Claims, 1 Drawing Sheet

(56) References Cited

OTHER PUBLICATIONS

May 8, 2018 International Preliminary Report on Patentability issued in International Patent Application No. PCT/US2016/000101.
Myrdal, Roar, "Corrosion Inhibitors—State of the art," SINTEF Building and Infrastructure (2010).
Sep. 5, 2018 Office Action issued in European Patent Application No. 16 862 594.5.

\* cited by examiner
† cited by third party

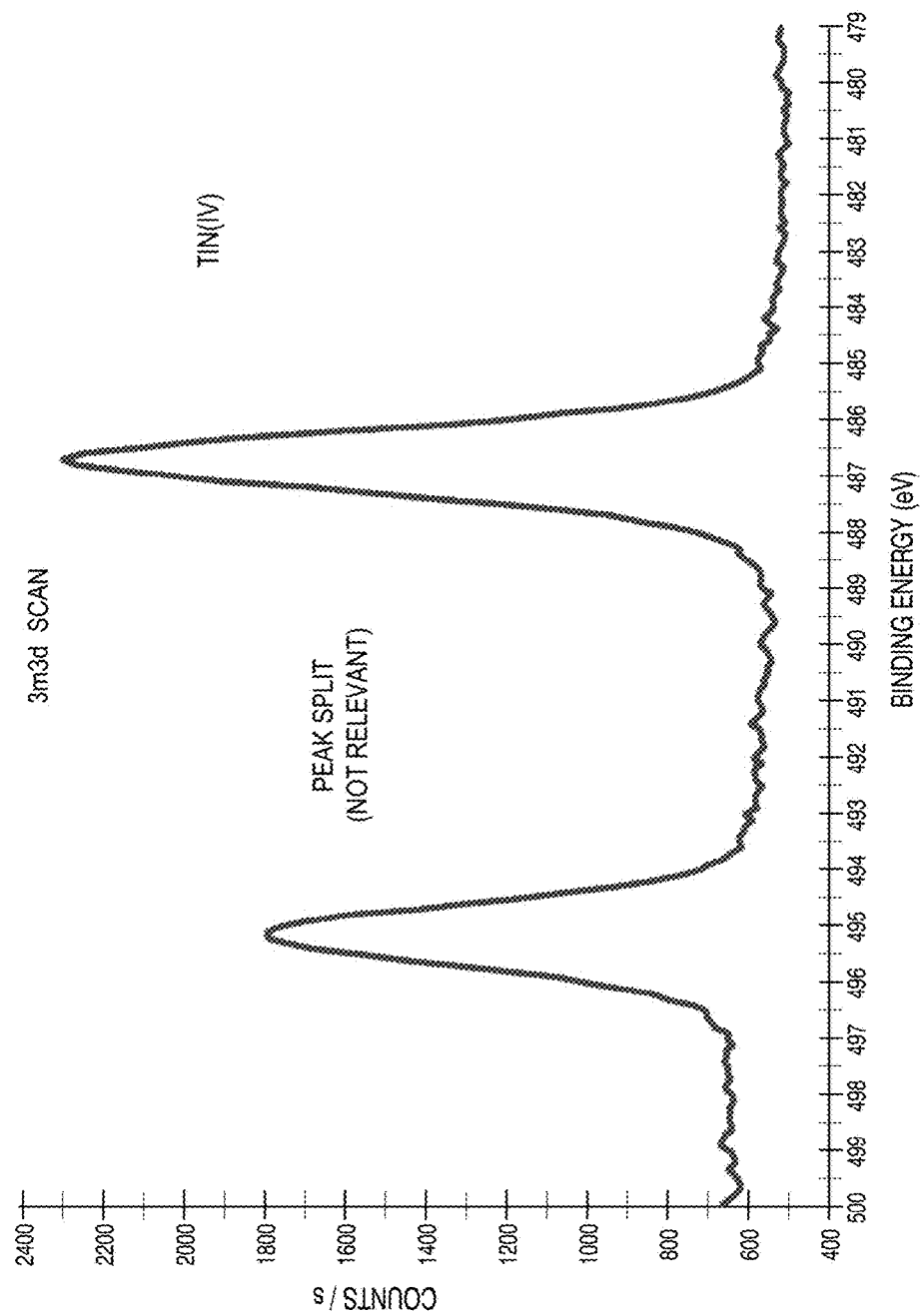

CORROSION CONTROL FOR WATER SYSTEMS USING TIN CORROSION INHIBITOR WITH A HYDROXYCARBOXYLIC ACID

TECHNICAL FIELD

This application is directed to methods and compositions for corrosion inhibitor treatment in water systems, such as those used in industrial processes.

BACKGROUND

Corrosion in industrial water systems is a serious problem. It causes undesirable consequences, including loss of heat transfer, increased cleaning frequency, equipment repairs and replacements, shutdowns, environmental problems and the increasing resources and costs associated with each.

Treatment of corrosion in water systems is typically achieved by continuous application of various corrosion inhibitors in the water including, for example, phosphates, polymer, chromates, zinc, molybdates, nitrites, and combinations thereof. These inhibitors work by the principle of shifting the electrochemical corrosion potential of the corroding metal in the positive direction indicating the retardation of the anodic process (anodic control), or displacement in the negative direction indicating mainly retardation of the cathodic process (cathodic control). Corrosion inhibitors act on the cathode and/or anode of the corrosion cell.

Historically, the use of Tin compounds as a corrosion inhibitor has been the subject of some experimentation in industrial water systems. Stannous salts are known to inhibit corrosion but, unlike more conventional corrosion inhibitors, the mechanism by which the stannous salts inhibited corrosion was not well understood. Previous corrosion inhibition programs utilized the stannous salts in much the same manner as conventional corrosion inhibitors in which doses of the stannous inhibitors were introduced into the aqueous systems to maintain a minimum stannous concentration in order to be effective. Examples of such methods may be found in, for example, U.S. Pat. No. 7,910,024 to Stapp et al. and U.S. Pat. Nos. 6,001,156 and 6,200,529 to Riggs, Jr., the contents of which are incorporated herein by reference, in their entireties.

Moreover, conventional corrosion inhibition practices with Tin compounds have not been able to effectively deal with the problem of maintaining an effective amount of Tin(II) in solution long enough to form a protective film on the surface of the corrosive metal without losing the active form, Tin (II), perhaps due to bulk phase oxidation and precipitation to Tin (IV). Further, use of organic compounds as corrosion inhibitors has been challenging and, in many cases, prohibitive due to volume and cost requirements. These and other issues are addressed by the present disclosure.

SUMMARY

It is an object of this disclosure to provide methods for improved and effective use of Tin-based corrosion inhibitors by including a promoter compound that enhances the effectiveness of the Tin-based corrosion inhibitor while allowing much smaller concentrations of inhibitor and promoter than previously known or contemplated. Without intending to be bound by theory, it is believed that the promoter compound is accomplishing two processes: (1) it is forming a corrosion inhibiting film on the metal surface, and (2) it is effectively chelating Tin(II) in solution long enough to form a protective film on the surface of the corrosive metal without losing active form. This film of Tin (IV) is shown to have remarkably better corrosion rates than either Ti(II) or the promoter alone and in lower concentrations than expected.

In a first embodiment, there is provided a method of suppressing corrosion of a corrodible metal surface that contacts a water stream in a water system. The method includes introducing into the water stream a treatment composition including a Tin(II) corrosion inhibitor and a hydroxycarboxylic acid promoter, wherein the treatment composition is introduced so that a concentration of tin in the water stream is in the range of 0.01 ppm to 3 ppm.

In another embodiment, there is provided a method of suppressing corrosion of a corrodible metal surface that contacts a water stream in a water system. The method includes introducing into the water stream a treatment composition including a Tin(II) corrosion inhibitor and a hydroxycarboxylic acid promoter, wherein the treatment composition is introduced into the water stream so that an initial ratio of a concentration of the corrosion inhibitor in the water stream in terms of ppm to a concentration of the promoter in the water stream in terms of ppm is in the range of 0.001 to 0.4.

In another embodiment, there is provided a chemical treatment composition used to suppress corrosion of a corrodible metal surface that contacts a water stream in a water system. The composition includes a Tin(II) corrosion inhibitor; and a hydroxycarboxylic acid promoter, wherein the corrosion inhibitor is present in an amount in the range of 0.1 to 5 wt % and the promoter is present in an amount in the range of 1 to 25 wt %.

BRIEF DESCRIPTION OF THE DRAWINGS

FIG. 1 is an x-ray photoelectron spectroscopic graph of a scanned mild steel coupon sample treated with a stannous-based corrosion inhibitor

DETAILED DESCRIPTION

[Overview]

Embodiments of the disclosed methods and compositions apply the discovery of improved corrosion inhibition to water systems including, but not limited to cooling towers, water distribution systems, boilers, pasteurizers, water and brine carrying pipelines, storage tanks and the like. Embodiments of the methods and compositions are particularly useful with cooling towers in industrial water processes. Improved corrosion inhibition can be achieved at lower cost and with less environmental impact by treating water systems with a corrosion inhibitor and a promoter compound. Disclosed embodiments form a very tenacious and persistent inhibitor film on the surface of corrodible metal by treatment with a corrosion inhibitor together with a promoter compound. As explained below, the methods of treating water systems with a corrosion inhibitor and a promoter compound are particularly useful for stannous corrosion inhibitors and hydroxycarboxylic acids.

These treatment methods result in synergistic corrosion inhibition and a significant reduction in the amount of corrosion inhibitor and promoter required, which is beneficial for the environment and reduces the cost of treatment. The methods provide for more economical treatment of large volume systems including, for example, once-through applications and other systems in which the water consumption and losses pose a significant challenge for dosage and control using conventional anti-corrosion treatments. The methods also greatly reduce the amount of corrosion inhibitor(s), such as stannous salts, required to protect the treated system by reducing consumptive losses associated with oxidation and discharge of water from the system.

Embodiments using stannous inhibitors are also beneficial if the effluent from the treated system is being used in a manner or for a purpose where a conventional inhibitor would be regarded as a contaminant or otherwise detrimental to the intended use. Such stannous-based corrosion inhibitors are more tolerant of overdosing when compared to conventional zinc or phosphate programs which rely on high volumes of polymeric dispersants to suppress formation of unwanted deposits.

Stannous corrosion inhibitors particularly suitable for use with the disclosed methods include Tin(II) compounds. Tin(II) is more soluble in aqueous solutions than a higher oxidation state metal ion, such as Tin(IV). For such metals, the lower oxidation state species can be introduced into the treated system by, for example, introducing a stannous salt directly or by feeding a concentrated solution into the treated system. Corrosion inhibitors are consumed within a treated system in various ways. These consumption pathways can be categorized as system demand and surface demand. Together, system demand and surface demand comprise total inhibitor demand.

System demand, in many scenarios, is attributed to the presence of oxygen, halogens, other oxidizing species and other components in the aqueous system that can react with or remove, and thereby deactivate or consume, the inhibitor. With stannous salt treatments, for example, oxidizing species can convert the preferred Tin(II) stannous ions to largely ineffective (at least in the process water stream) Tin(IV) stannate ions. System demand also includes inhibitor losses associated with bulk water loss through, for example, blow down and/or other discharges from the treated system.

Surface demand is the consumption of the inhibitor attributed to the interaction between the inhibitor and a reactive metal surface. Surface demand will decline as the inhibitor forms a protective film or layer on those metal surfaces that were vulnerable to corrosion. Once all of the wetted surfaces have been adequately protected, the surface demand may be nothing or almost nothing. Once the surface demand is reduced to values close to zero, the requirement for additional corrosion inhibitor may be substantially reduced or even terminated for some period of time without compromising the effectiveness of the corrosion inhibition.

Stannous compounds undergo oxidation at the vulnerable metal surfaces, or those surfaces in need of corrosion protection, and form an insoluble protective film. These metal surfaces can also react with the stannous compounds to form metal-tin complexes, which again form protective films on the metal surface. Without intending to be bound by theory, stannous inhibitors applied in accordance with the disclosed methods appear to form a protective film on reactive metals by at least three mechanisms. A first mechanism involves forming an insoluble stannous hydroxide layer under alkaline conditions. This stannous hydroxide appears to oxidize further to form a stannate oxide layer, which is even more insoluble, resulting in a protective film which is resistant to dissolution from the surface even in the absence of stannous salts in the process water. A second mechanism may be achieved under acidic conditions or in the presence of surface oxidants, for example, ferric or cupric ions, whereby the stannous salts can be directly oxidized to highly insoluble stannate salts. These stannate salts then precipitate onto the metal surface to form a protective layer and provide the desired corrosion inhibition function. A third mechanism may be achieved under alkaline conditions whereby existing metal oxides are reduced to more stable reduced forms that incorporate insoluble stannate salts in a hybrid film.

In each of the above mechanisms, the final result is a stannate film, Tin (IV), formed on or at the metal surface. The insolubility and stability of the resulting stannate film provides an effective barrier to corrosion for a limited time period even in the absence of additional stannous species being provided in the aqueous component of the treated system. The Tin (IV) film structure has been confirmed by X-ray photoelectron spectroscopy (XPS) analysis of metal surfaces. XPS reveals the presence of the Tin(IV) film on the metal coupon surface.

FIG. 1 illustrates an XPS examination of the chemical composition of a mild steel coupon that is pre-treated with a stannous-based passivating agent. This demonstrates that one mechanism of corrosion inhibition is by oxidation of Tin(II) to Tin(IV) and forming an insoluble Tin(IV) film on the metal surface of the coupon under these test conditions. The peak at 487 eV corresponds to Tin in the (IV) oxidation state. Similar XPS analysis was conducted on a various other metals and alloys such as, but not limited to, copper, brass, aluminum, galvanized steel, etc., coupons and the results were confirmed.

[Corrosion Inhibitor with Promoter]

In a first embodiment, there is provided a method of suppressing corrosion of a corrodible metal surface that contacts a water stream in a water system. The corrodible metal surface may be a metal or alloy selected from the group consisting of ferrous metals, aluminum metals, brass, copper containing alloys, and galvanized steels. The method includes introducing into the water stream a treatment composition over a first time period, the treatment composition including a Tin(II) corrosion inhibitor and a hydroxycarboxylic acid promoter. The combination of the Tin(II) corrosion inhibitor and the hydroxycarboxylic acid promoter in a combined treatment feeding results in a synergistic anti-corrosive effect. For example, the combined treatment according to embodiments results in unexpectedly high anti-corrosion rates using relatively smaller effective amounts of Tin(II) and hydroxycarboxylic acid promoter that are otherwise not as effective in single treatment regimes. Without intending to be bound by theory, it is believed that the promoter compound is accomplishing two processes: (1) it is forming a corrosion inhibiting film on the metal surface, and (2) it is effectively chelating the Tin(II) active state for a longer period of time than conventionally known thereby enabling the Tin(II) to react with the metal surface and form a resilient Tin(IV) film. Although the mechanism is unknown, it is believed that the hydroxycarboxylic acid promotes the Tin(II) active state by acting as chelating agent.

In this embodiment, the corrosion inhibitor is preferably Tin(II). The corrosion inhibitor may be provided as a stannous salt selected from the group consisting of stannous sulfate, stannous bromide, stannous chloride, stannous oxide, stannous phosphate, stannous pyrophosphate, and stannous tetrafluroborate. Other reactive metal salts, for example, zirconium and/or titanium metal salts, may also be used in treatment methods according to the present disclosure. Indeed, embodiments of the disclosed methods should be operable with any metal salt capable of forming stable metal oxides resistant to dissolution under the conditions in the targeted system.

Promoter compounds particularly suitable for use in this embodiment are hydroxycarboxylic acids. Hydroxycarboxylic acids are carboxylic acids substituted with a hydroxyl group on adjacent carbon moieties. Hydroxycarboxylic acids are well known organic compounds applied in various applications. Examples include, but are not limited to, tartaric acid, glucaric acid, maleic acid, gluconic acid and polyaspartic acid. In embodiments, the promoter can be glucaric acid. In embodiments, the promoter can be a polymeric hydroxycarboxylic acid.

In this embodiment, a ratio of a concentration of the corrosion inhibitor in the water stream in terms of ppm to a concentration of the promoter in the water stream in terms of ppm is in the range of 0.001 to 0.4, 0.01 to 0.2666, or more preferably 0.05 to 0.1666. The ratio may also be in the range of 0.00025 to 0.4, 0.00033 to 0.2666, or more preferably 0.005 to 0.1666. In absolute terms, the first concentration of the Tin(II) corrosion inhibitor in the water stream may be present in relatively small amounts, e.g., in the range of 0.01 ppm to 3 ppm, 0.05 ppm to 2 ppm, or preferably, 0.1 ppm to 1.25 ppm, or more preferably, 0.3 ppm to 1.25 ppm, in the water system. The first concentration of the hydroxycarboxylic acid promoter in the water stream may be present in the range of 0.1 ppm to 40 ppm, 0.5 ppm to 30 ppm, or preferably, 5 ppm to 20 ppm, or more preferably, 7.5 ppm to 20 ppm, in the water system. The concentration of the inhibitor and promoter achieved during the corrosion inhibitor treatment can be selected to exceed the baseline system demand and thereby ensure that a portion of the inhibitor fed is available to treat the vulnerable metal surfaces.

The method and manner by which a corrosion treatment is infused into a water stream is not particularly limited by this disclosure. Treatment can be infused into the water system at a cooling tower, for example, or any suitable location of the water stream in the water system. Methods for infusing the corrosion treatment, including controlling the flow of the infusion, may include a multi-valve system or the like, as would be understood by one of ordinary skill in the art. Moreover control of the treatment while in the system is not particularly limited. Infusion control, including frequency, duration, concentrations, dosing amounts, dosing types and the like, may be controlled manually or automatically through, for example, an algorithm or a computer executable medium, such as a CPU. These controls may further be implemented with data and history-driven learning capabilities and feedback loops for automatically adapting treatment regimens to system and metallic surface environmental conditions. The treatment can be continuous, intermittent or periodic. The Tin(II) corrosion inhibitor can be added to the water stream apart from the hydroxycarboxylic acid promoter, or each can be added separately.

The treatment may stay in the system for a full cycle (i.e., through a heat exchanger, etc.) or several cycles, and is then gradually removed from the system with the process water in the system, for example, through known blowdown removal techniques in the case of a cooling water. Corrosion inhibitors are consumed within a treated system in various ways. These consumption pathways can be categorized as system demand and surface demand. Together, system demand and surface demand comprise total inhibitor demand.

The amount of the treatment composition can be applied based on the system demand and surface demand for the inhibitor. Controlling the amount of the treatment composition can utilize a number of parameters associated with surface and system demands including, for example, the concentration of corrosion products in the water or the demand of a surface of the metal for reduction species. Other parameters such as on-line corrosion rates and/or oxidation reduction potential (ORP) may also be used for controlling the treatment frequency or monitoring system performance.

The treatment may include, in addition to the corrosion inhibitor or a salt thereof, such as Tin(II)/stannous chloride or the like, many other materials. For example, the treatment may comprise, at least one of citric acid, benzotriazole and 2-Butenedioic acid (Z), bicarbonates for increasing the alkalinity of the solution, a polymeric dispersant, such as 2-acrylamido-2-methylpropane sulfonic acid (AMPS), for inhibiting silt or fouling, and polymaleic acid (PMA) for inhibiting scaling. The treatment may include, for example, ChemTreat FlexPro™ CL5632 (a phosphorous-free and zinc-free corrosion treatment), manufactured by ChemTreat, Inc., or the like.

The corrosion inhibitor composition may be shot-dosed, service-dosed or continuously fed. The duration of the treatment dosing can range from 5 minutes to 2 days, or more preferably, from 10 minutes to 24 hours, in the case of shot-dosing. The duration of service-dosing may be substantially the same or less depending on the target concentration requirements in the water stream. Similarly, the duration of continuous feeding treatments depend on system demand as discussed herein.

At the early stages of the treatment in a system with existing corrosion and/or exposed metal surfaces, the total inhibitor demand will be high but will decrease as metal surfaces are treated by the inhibitor treatment. A treatment end point is reached where all surfaces are treated and only the system (non-metal surface) demand remains. Once effective treatment is achieved using the treatment period(s), the system can be operated for extended periods without the need for any further addition of corrosion inhibitor or with a substantially reduced level of corrosion inhibitor.

In another embodiment, after the period where substantially reduced levels of corrosion inhibitor are added, the method may include introducing into the water stream the treatment composition over a second time period, during which a second concentration of the corrosion inhibitor in the water stream may be substantially the same or less than the initial concentration of the corrosion inhibitor. In the second time period, a second concentration of the promoter in the water stream may be substantially the same or less than the first concentration of the promoter. The duration of the second time period is not particularly limited and may be shorter of longer than the first time period depending on system requirements.

In embodiments employing such intermittent or periodic treatment, the frequency or time between treatments is not particularly limited. The frequency may be from about 2 to 30 days, or preferably 3 to 7 days. More preferably, the time between treatments is about 7 days. In some systems, it may be beneficial to maintain some continuous level of active corrosion inhibitor in the water process stream after the treatment period. Maintaining a continuous low to very low level of active corrosion inhibitor after the treatment dosing may reduce the frequency at which subsequent treatments are needed. The duration, timing and concentration of the treatment doses can vary with the system demand as described herein.

As will be appreciated, the frequency of the combination feedings and the inhibitor and promoter concentrations necessarily will be a function of the system being treated and can be set and/or adjusted empirically based on test or historical data. In embodiments, the concentration of the inhibitor achieved during the treatment can be selected to exceed the baseline system demand and thereby ensure that a portion of the inhibitor fed is available to treat the vulnerable metal surfaces.

The success of the treatment may be evaluated by monitoring the total inhibitor demand which, when the surface demand is effectively suppressed or eliminated, will be essentially equal to the system demand. The system demand, in turn, can be measured indirectly by monitoring parameters such as ORP and oxygenation levels. Thus, according to one embodiment, the treatment method may further comprise measuring and monitoring a characteristic of the metal surface or water stream during or after treatments to determine a time to initiate the treatment comprising the corrosion inhibitor and promoter, and/or a concentration of the inhibitor and promoter in the treatment composition.

If desired, additional corrosion inhibition and/or water treatment chemistry known in the art can be introduced into the system in conjunction with the combination feeding to further improve corrosion performance and control deposition of undesirable species. As will be appreciated, the treatment methods according to the disclosure can be paired with other treatment or conditioning chemistries that would be compromised by the continuous presence of the corrosion inhibitor. Alternatively, "greener" treatment packages or treatment packages designed to address other parameters of the system operation can be utilized between the intermittent feedings to improve the quality of the system effluent and/or reduce the need for effluent treatment prior to discharge.

According to one embodiment, treatment composition may comprise a reducing agent. Controlling the amount of reducing agent, including frequency, duration and concentration, according to methods described herein, may lead to more effective corrosion inhibition methods. The reducing agent may be, for example, erythrobate, glycolic acid or other aliphatic polycarboxylic acid, amine carboxylic acid, phosphonocarboxylic acid, hydroxycarboxylic acids, hydroxyphosphono carboxylic acid based complexing agents, or combinations thereof.

The treatment composition can include adding stannous in conjunction with one of more secondary corrosion inhibitor including, for example, inorganic and organic phosphates, zinc salts, nitrite/nitrate salts, molybdate salts, chromate salts, unsaturated carboxylic acid polymers such as polyacrylic acid, homo or co-polymaleic acid (synthesized from solvent and aqueous routes); acrylate/2-acrylamido-2-methylpropane sulfonic acid (AMPS) copolymers, acrylate/acrylamide copolymers, acrylate homopolymers, terpolymers of carboxylate/sulfonate/maleate, terpolymers of acrylic acid/AMPS; phosphonates and phosphinates such as 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), diethylenetriamine penta(methylene phosphonic acid) (DETPMP), phosphinosuccinic oligomer (PSO); salts of molybdenum and tungsten including, for example, nitrates and nitrites; amines such as N,N-diethylhydroxylamine (DEHA), diethyl amino ethanol (DEAE), dimethylethanolamine (DMAE), cyclohexylamine, morpholine, monoethanolamine (MEA); azoles such as tolyltriazole (TTA), benzotriazole (BZT), butylbenzotriazole (BBT), halogenated azoles and their salts.

The treatment composition may further comprise at least one chelating agent such as, for example, citric acid, azole based copper corrosion inhibitors such as benzotriazole and 2-Butenedioic acid (Z), halogenated azoles and their derivatives. The treatment composition may further comprise scale inhibitors and dispersants selected from the group consisting of one or more of unsaturated carboxylic acid polymers such as polyacrylic acid, homo or co-polymaleic acid (synthesized from solvent and aqueous routes); acrylate/2-acrylamido-2-methylpropane sulfonic acid (APMS) copolymers, acrylate/acrylamide copolymers, acrylate homopolymers, terpolymers of carboxylate/sulfonate/maleate, terpolymers of acrylic acid/AMPS; phosphonates and phosphinates including 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), diethylenetriamine penta (methylene phosphonic acid) (DETPMP), phosphinosuccinic oligomer (PSO); salts of molybdenum and tungsten including nitrates and nitrites; amines such as N,N-diethylhydroxylamine (DEHA), diethyl amino ethanol (DEAE), dimethylethanolamine (DMAE), cyclohexylamine, morpholine, monoethanolamine (MEA), a biocide, and combinations thereof.

In another embodiment, there is provided a chemical treatment composition used to suppress corrosion of a corrodible metal surface that contacts a water stream in a water system. The composition including the Tin(II) corrosion inhibitor and the hydroxycarboxylic acid promoter as described herein. The composition can be an aqueous composition that is fed into a water stream of the water system. The corrosion inhibitor may be present in an amount in the range of 0.01 to 10 wt %, 0.1 to 5 wt %, or 1 to 5 wt %. The promoter may be present in an amount in the range of 0.1 to 40 wt %, 1 to 25 wt %, or 10 to 25 wt %.

In embodiments, the treatment composition may be introduced into open or closed water systems. Further, the treatment can be applied to the water stream while the water system is on-line. Alternatively, the treatment composition may be introduced into the water stream while the system is offline such as during pre-treating the corrodible metal surface before the equipment is brought into service in the water system.

EXAMPLES

The following Examples illustrate applications of the treatment methods disclosed herein. In the Examples, chemical concentrations used are expressed in parts per million (ppm). The unit of corrosion rate is in mils per year (mpy). The corrosion inhibition efficiency was calculated according to the following equation:

$$\% \text{ Improvement} = \left[ \frac{(CR \text{ w/single treatment} - CR \text{ w/combination treatment})}{CR \text{ w/single treatment}} \right] \times 100\%$$

The water chemistry used for these Examples was as follows:

| | |
|---|---|
| pH | 8 |
| Malk | 230 ppm |
| Ca Hardness | 270 ppm |
| Mg Hardness | 120 ppm |
| Chloride | 275 ppm |

In each Example, carbon steel 1010 coupons were used and corrosion rates were determined by using a 10 L "spinner bath" apparatus. Corrosion rates were calculated over 3 days at 50° C.

Example I

In this example, Examples 1-5 and Comparative Examples 1-7 were tested in the water chemistry described above. The Examples have both glucaric acid and tin (from stannous chloride) in the amounts indicated. The results are illustrated in Table 1 below.

TABLE 1

| Sample | Tin (ppm) | Glucaric Acid (ppm) | Corrosion Rate (mpy) |
|---|---|---|---|
| Example 1 | 1.25 | 20 | 0.43 |
| Example 2 | 1.25 | 12.5 | 0.59 |
| Example 3 | 1.25 | 7.5 | 0.61 |
| Example 4 | 0.625 | 20 | 0.69 |
| Example 5 | 0.3 | 20 | 0.97 |
| Comparative Example 1 | 1.25 | 0 | 0.92 |
| Comparative Example 2 | 0.6 | 0 | 1.71 |
| Comparative Example 3 | 0.625 | 0 | 1.97 |
| Comparative Example 4 | 0.3 | 0 | 5.76 |
| Comparative Example 5 | 0 | 20 | 3.44 |
| Comparative Example 6 | 0 | 12.5 | 4.31 |
| Comparative Example 7 | 0 | 7.5 | 6.87 |

As seen in Table 1, Examples 1-5, corresponding to disclosed embodiments, resulted in substantially better corrosion rates than Comparative Examples 1-7. Corrosion rates of 3 mpy or less are generally considered acceptable and corrosion rates of 1 mpy or less are considered excellent in the water treatment industry. While increasing the concentration of Tin can result in good corrosion resistance (see Comparative Example 1), unexpectedly better results are obtained by combining Tin and glucaric acid treatment (see Examples 1-5). Also, even though the corrosion rate of Comparative Example 1 is comparable to Example 5, Comparative Example 1 used more than four times the level of Tin to achieve the same corrosion rate. This shows that substantially less Tin can be used when a promoter is included, which is very beneficial because Tin is by far the most expensive component. Moreover, the best results were obtained by using higher concentrations of both Tin and glucaric acid within the acceptable range of the disclosed embodiments. These results suggest that the treatment methods using Tin and glucaric acid in combination resulted in better corrosion rates with lower concentrations of inhibitor and promoter as compared to conventional methods using Tin alone.

Example II

In this example, Examples 6-8 and Comparative Example 8 were tested in the water chemistry described above. The results are illustrated in Table 2 below, which illustrates the percent improvement in the corrosion rates by adding various levels of glucaric acid to 0.3 ppm of Tin.

TABLE 2

| Sample | Tin (ppm) | Glucaric Acid (ppm) | Corrosion Rate (mpy) | % Improvement in Corrosion Rate (relative to baseline) |
|---|---|---|---|---|
| Comparative Example 8 | 0.3 | 0 | 5.76 | baseline |
| Example 6 | 0.3 | 7.5 | 1.38 | 76 |
| Example 7 | 0.3 | 10 | 1 | 82.57 |
| Example 8 | 0.3 | 20 | 0.97 | 83.14 |

As seen in Table 2, the addition of glucaric acid to the Tin corrosion inhibitor in Examples 6-8 according to disclosed embodiments shows an unexpectedly large increase in improvement in corrosion rate compared to the baseline (Comparative Example 8). Moreover, increasing the amount of glucaric acid progressively from 7.5 ppm to 20 ppm as shown in Examples 6-8 results in a corresponding progressive increase in improvement in corrosion rate (i.e., 76%, 82.57%, 83.14%), as seen in Table 2. These results suggest that using Tin and glucaric acid in combination have a synergistic corrosion inhibitor effect that can result in better corrosion rates with an unexpectedly low concentration of inhibitor and promoter. In this regard, a 76% improvement in the corrosion rate is seen when a promoter is added to the Tin treatment. These results further suggest that increasing the amount of promoter within the range of disclosed embodiments has the effect of improving corrosion rate.

Example III

In this example, Examples 9-11 and Comparative Example 9 were tested in the water chemistry described above. The results are illustrated in Table 3 below, which illustrates the percent improvement in the corrosion rates by adding various levels of Tin to 20 ppm of glucaric acid.

TABLE 3

| Sample | Tin (ppm) | Glucaric Acid (ppm) | Corrosion Rate (mpy) | % Improvement in Corrosion Rate (relative to baseline) |
|---|---|---|---|---|
| Comparative Example 9 | 0 | 20 | 3.44 | baseline |
| Example 9 | 0.3 | 20 | 0.97 | 71.8 |
| Example 10 | 0.6 | 20 | 0.69 | 79.94 |
| Example 11 | 1.25 | 20 | 0.43 | 87.5 |

As seen in Table 3, the addition of Tin corrosion inhibitor to glucaric acid in Examples 9-11 according to disclosed embodiments shows an unexpected increase in improvement in corrosion rate compared to the baseline Comparative Example 9. Moreover, increasing the amount of Tin progressively from 0.3 ppm to 1.25 ppm, as shown in Examples 9-11, results in a corresponding progressive increase in improvement in corrosion rate (i.e., 71.8%, 79.94%, 87.5%), as seen in Table 3. These results suggest that the combined feeding methods using Tin and glucaric acid in combination can result in better corrosion rates with an unexpectedly low concentration of inhibitor and promoter, and that increasing the amount of corrosion inhibitor within the range of disclosed embodiments has the effect of improving corrosion rate.

Example IV

In this example, Examples 12 and 13 and Comparative Example 10 were tested in the water chemistry described above. The results are illustrated in Table 4 below, which illustrates the percent improvement in the corrosion rates by adding various levels of Tin to 15 ppm of glucaric acid.

TABLE 4

| Sample | Tin (ppm) | Glucaric Acid (ppm) | Corrosion Rate (mpy) | % Improvement in Corrosion Rate (relative to baseline) |
|---|---|---|---|---|
| Comparative Example 10 | 0 | 15 | 6.87 | baseline |
| Example 12 | 0.3 | 15 | 1.38 | 79.91 |
| Example 13 | 0.6 | 15 | 0.82 | 88.06 |

As seen in Table 4, the addition of Tin corrosion inhibitor to glucaric acid in Examples 12 and 13 according to disclosed embodiments also shows an unexpected increase in improvement in corrosion rate compared to the baseline Comparative Example 10 with the single feed (glucaric acid only) method. Similar to the results in Example III, increasing the amount of Tin progressively, from 0.3 ppm to 0.6 ppm, as shown in Examples 12 and 13, results in a corresponding progressive increase in improvement in corrosion rate (i.e., 79.91%, 88.06%), as seen in Table 4. These results further suggest that the methods using Tin and glucaric acid in combination can result in better corrosion rates with an unexpectedly low concentration of inhibitor and promoter, and that increasing the amount of corrosion inhibitor within the range of disclosed embodiments has the effect of improving corrosion rate.

In summary, the treatment methods using Tin and glucaric acid in combination resulted in dramatically better corrosion rates while allowing for substantially less Tin than is required in conventional methods using Tin alone to achieve comparable corrosion resistance.

It will be appreciated that the above-disclosed features and functions, or alternatives thereof, may be desirably combined into different systems or methods. Also, various alternatives, modifications, variations or improvements may be subsequently made by those skilled in the art, and are also intended to be encompassed by the following claims. As such, various changes may be made without departing from the spirit and scope of this disclosure as defined in the claims.

What is claimed is:

1. A method of suppressing corrosion of a corrodible metal surface that contacts a water stream in a water system, the method comprising:
   introducing into the water stream a treatment composition including a Tin(II) corrosion inhibitor and a hydroxycarboxylic acid promoter, the hydroxycarboxylic acid promoter having a carboxylic acid group and a hydroxyl group that is bonded to a carbon atom that is adjacent to the carboxylic acid group,
   wherein the treatment composition is introduced so that a concentration of tin in the water stream is in the range of 0.1 to 1.25 ppm, and
   the treatment composition is introduced so that a concentration of the promoter in the water stream is in the range of 7.5 ppm to 20 ppm.

2. The method of suppressing corrosion according to claim 1, wherein the hydroxycarboxylic acid promoter is selected from the group consisting of tartaric acid, glucaric acid, and gluconic acid.

3. The method of suppressing corrosion according to claim 2, wherein the hydroxycarboxylic acid promoter is glucaric acid.

4. The method of suppressing corrosion according to claim 1, wherein the corrosion inhibitor is provided as a stannous salt selected from the group consisting of stannous sulfate, stannous bromide, stannous chloride, stannous oxide, stannous phosphate, stannous pyrophosphate, and stannous tetrafluroborate.

5. The method of suppressing corrosion according to claim 1, wherein the treatment composition further comprises a reducing agent selected from the group consisting of erythrobate, glycolic acid or other aliphatic polycarboxylic acid, amine carboxylic acid, phosphonocarboxylic acid, hydroxycarboxylic acids, hydroxyphosphono carboxylic acid based complexing agents, or combinations thereof.

6. The method of suppressing corrosion according to claim 1, wherein the water system is selected from the group consisting of cooling towers, water distribution systems, boilers, water/brine carrying pipelines, and storage tanks.

7. The method of suppressing corrosion according to claim 1, wherein the corrodible metal surface is a metal or alloy selected from the group consisting of ferrous metals, aluminum metals, brass, copper containing alloys, mild steels, carbon steels, and galvanized steels.

8. The method of suppressing corrosion according to claim 1, wherein the treatment composition is provided in sufficient amount and for sufficient time to form a stable protective tin film on at least a portion of the corrodible metal surface.

9. The method of suppressing corrosion according to claim 1, wherein the treatment composition is introduced into the water stream while the water system is on-line.

10. A method of suppressing corrosion of a corrodible metal surface that contacts a water stream in a water system, the method comprising:
    introducing into the water stream a treatment composition including a Tin(II) corrosion inhibitor and a hydroxycarboxylic acid promoter, the hydroxycarboxylic acid promoter having a carboxylic acid group and a hydroxyl group that is bonded to a carbon atom that is adjacent to the carboxylic acid group,
    wherein a concentration of the corrosion inhibitor in the water stream is in the range of 0.1 to 1.25 ppm, and
    the treatment composition is introduced into the water stream so that an initial ratio of the concentration of the corrosion inhibitor in the water stream in terms of ppm to a concentration of the promoter in the water stream in terms of ppm is in the range of 0.005 to 0.166.

11. A chemical treatment composition used to suppress corrosion of a corrodible metal surface that contacts a water stream in a water system, the composition consisting of:
    a Tin(II) corrosion inhibitor; and
    a hydroxycarboxylic acid promoter, the hydroxycarboxylic acid promoter having a carboxylic acid group and a hydroxyl group that is bonded to a carbon atom that is adjacent to the carboxylic acid group,
    wherein the corrosion inhibitor is present in an amount in the range of 0.1 to 5 wt % and the promoter is present in an amount in the range of 1 to 25 wt %.

* * * * *